(12) United States Patent
Morita

(10) Patent No.: US 6,466,463 B1
(45) Date of Patent: Oct. 15, 2002

(54) SWITCHING POWER SUPPLY

(75) Inventor: Koichi Morita, Fujimi (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/118,713

(22) Filed: Apr. 9, 2002

(30) Foreign Application Priority Data

Apr. 18, 2001 (JP) ........................................ 2001-119916

(51) Int. Cl.$^7$ ............................................. H02M 3/335
(52) U.S. Cl. .................................................. 363/21.16
(58) Field of Search ...................... 363/21.12, 21.16, 363/21.15, 21.17, 97, 131

(56) References Cited

U.S. PATENT DOCUMENTS 5,793,621 A * 8/1998 Yamada ....................... 315/411

FOREIGN PATENT DOCUMENTS

JP 08154379 A 6/1996

* cited by examiner

*Primary Examiner*—Shawn Riley
(74) *Attorney, Agent, or Firm*—Woodcock Washburn LLP

(57) ABSTRACT

A switching power supply capable of translating a.c. voltage into d.c. voltage includes a rectifier circuit connected to a pair of a.c. input terminals, a transformer having a primary winding, a rectifying and smoothing circuit connected to the transformer, switch connected between the transformer and a ground-potential output conductor of the rectifier circuit, an inductor connected between the first output conductor and ground-potential output conductor of the rectifier circuit at least via the switch, and a smoothing capacitor connected between the first output conductor and the ground-potential output conductor of the rectifier circuit via the transformer and the inductor. An ancillary charging circuit is provided which includes an ancillary winding electromagnetically coupled to the primary winding of the transformer.

12 Claims, 10 Drawing Sheets

SWITCHING POWER SUPPLY

BACKGROUND OF THE INVENTION

This invention relates to electric power supplies, and particularly to a switching power supply capable of a.c. to d.c. voltage conversion, featuring provisions for attainment of closer approximation of the input current waveform to a sinusoidal wave, and a higher power factor, than by the comparable prior art.

A conversion from an alternating to a direct current is possible by a rectifying and smoothing circuit comprising a rectifying circuit having a diode connected to an a.c. power supply, and a smoothing capacitor connected to the rectifying circuit. This type of rectifying and smoothing circuit possesses the disadvantage, however, of a somewhat poor power factor as a result of the fact that the smoothing capacitor is charged only at or adjacent the peaks of the a.c. voltage of sinusoidal waveform. Another drawback is that it is incapable of adjustably varying the d.c. output voltage.

Japanese Unexamined Patent Publication No. 8-154379 represents an improvement of the rectifying and smoothing circuit above. It teaches a switching power supply comprising a rectifying circuit, a smoothing capacitor, a d.c.-to-d.c. converter circuit, and an inductive reactor for a higher power factor. The reactor is electrically connected between the pair of output terminals of the rectifying circuit upon closure of a switch included in the d.c.-to-d.c. converter circuit. The desired improvement in power factor is thus attained, as the current flowing through the reactor varies in amplitude in step with the a.c. input voltage.

This prior art switching power supply has proved to have its own shortcomings. There flows through the reactor the current not only for power factor improvement but for charging the smoothing capacitor. The reactor had to be inconveniently bulky for carrying such large current and actually gave rise to power loss to an intolerable degree.

SUMMARY OF THE INVENTION

The present invention seeks to improve the switching power supply of the noted type having an inductor, for still higher efficiency without impairment of its inherent advantages.

Briefly, the invention may be summarized as a switching power supply capable of translating a.c. voltage into d.c. voltage. Included are a rectifier circuit connected to a pair of a.c. input terminals for rectifying a.c. input voltage, a transformer having a primary winding, a rectifying and smoothing circuit connected between the transformer and a pair of d.c. output terminals for providing d.c. output voltage. The rectifier circuit has a first output conductor for outputting a first rectifier output voltage, a second output conductor for outputting a second rectifier output voltage which is substantially the same as the first rectifier output voltage, and a third output conductor or ground-potential output conductor. Also included are a switch connected between the transformer and the third output conductor of the rectifier circuit in order to be turned on and off at a repetition frequency higher than the frequency of the a.c. input voltage in order to keep the d.c. output voltage at a prescribed value, an inductor connected between the first output conductor and the third output conductor of the rectifier circuit at least via the switch, and a smoothing capacitor connected between the first output conductor and the third output conductor of the rectifier circuit via the transformer and the inductor. Additionally, and perhaps most characteristically, an ancillary charging circuit is provided which has an ancillary winding which is electromagnetically coupled with the primary winding of the transformer and which is connected between the second output conductor of the rectifier circuit and the smoothing capacitor.

Utilizing the voltage across the ancillary winding added to the preexisting transformer, the ancillary charging circuit coacts with the rectifier circuit to charge the smoothing capacitor to a required voltage. Two separate current paths are thus obtained for charging the smoothing capacitor, one through the inductor, which has been conventionally designed for a higher power factor and more sinusoidal input waveform, and the other through the ancillary charging circuit constituting the gist of this invention. The smoothing capacitor needs to be charged through the two current paths to the same voltage as through the prior art single path, so that the magnitude of the current flowing through the inductor can be lessened by an amount equal to the magnitude of the current supplied from the ancillary charging circuit. The desired objective of higher efficiency is thus accomplished as less power loss is bound to occur at the inductor. This inductor can moreover be made appreciably less in size than in the absence of the ancillary charging circuit.

The instant invention also provides for an alternative method of operation: The smoothing capacitor may be charged to a voltage higher than heretofore with the aid of the ancillary charging circuit. Charged to such a voltage, the smoothing capacitor can be prevented from the inflow of excessive current through the inductor at or adjacent the peaks of the a.c. input voltage, with consequent curtailment of the higher harmonics of the input current.

The ancillary charging circuit required by the invention should be as simple and inexpensive in construction as feasible. To this end the invention suggests use of an ancillary winding incorporated with the transformer, a standard component of this type of switching power supply, as a primary component of the ancillary charging circuit. The operational advantages gained by the ancillary charging circuit are a sufficient justification for its addition to the switching power supply, as judged from the cost performance of the resulting device.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
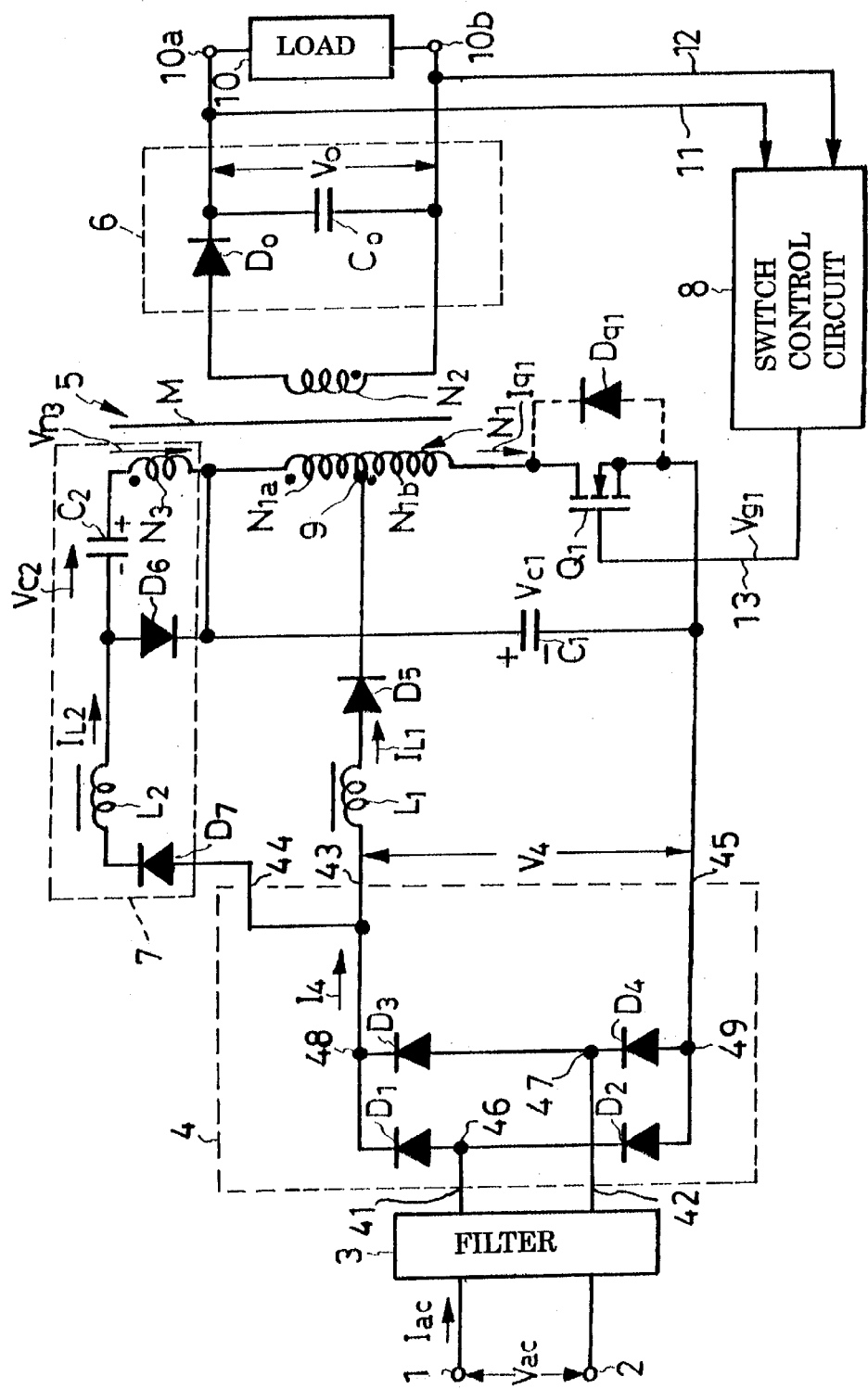
FIG. 1 is a schematic electrical diagram of a first preferred form of switching power supply according to the invention.

The switching power supply shown in FIG. 1 by way of a preferable embodiment of the invention has a pair of input terminals 1 and 2 which are to be connected to a source, not shown, of commercial alternating current with a frequency of, for instance, 50 Hz. A noise filter 3 is connected to this pair of input terminals 1 and 2. The noise filter 3 can be of the conventional make comprising inductors and capacitors for removal of high-frequency noise from the incoming fixed-frequency alternating current.

The noise filter 3 is connected to a rectifier circuit 4 having four diodes $D_1$, $D_2$, $D_3$ and $D_4$. The first diode $D_1$ has its anode connected to the cathode of the second diode $D_2$, and its cathode connected to the cathode of the third diode $D_3$. The anode of the second diode $D_2$ is connected to that of the fourth diode $D_4$. The anode of the third diode $D_3$ is connected to the cathode of the fourth diode $D_4$. The noise filter 3 has a first output conductor 41 connected to a junction 46 between the first and second diodes $D_1$ and $D_2$, and a second output conductor 42 connected to a junction 47 between the third and fourth diodes $D_3$ and $D_4$.

The rectifier circuit 4 has three output conductors 43, 44 and 45. The first and second output conductors 43 and 44 are both connected to a junction 48 between the cathodes of the first and third diodes $D_1$ and $D_3$, so that the output potential on these two conductors 43 and 44 is the same in this embodiment of the invention. The third output conductor 45 is a ground potential conductor connected to a junction 49 between the anodes of the second and fourth diodes $D_2$ and $D_4$. The same rectifier output voltage $V_4$ is therefore obtained between the first and third output conductors 43 and 45 and between the second and third output conductors 44 and 45.

At 5 is shown a transformer having a primary winding $N_1$, a secondary winding $N_2$, and, according to a feature of this invention, a tertiary or ancillary winding $N_3$, all wound around a magnetic core M and electro-magnetically coupled together. The transformer primary $N_1$ is center tapped at 9 and thereby divided into two parts $N_{1a}$ and $N_{1b}$. The transformer primary $N_1$ and secondary $N_2$ are opposite in polarization, but the transformer primary $N_1$ and tertiary $N_3$ are the same, as indicated by the dots in FIG. 1.

A smoothing capacitor $C_1$, preferably an electrolytic capacitor, has one of its opposite polarity terminals connected to the first output conductor 43 of the rectifier circuit 4 via the transformer primary first part $N_{1a}$, a reverse blocking diode $D_5$ and inductor $L_1$. The other terminal of the smoothing capacitor $C_1$ is connected to the ground-potential output conductor 45 of the rectifier circuit 4.

Shown as a insulated gate field-effect transistor, a switch $Q_1$ is connected in parallel with the smoothing capacitor $C_{dc}$ via the transformer primary $N_1$. The switch $Q_1$ has its drain connected to the first rectifier output conductor 43 via the transformer primary second part $N_{1b}$, reverse blocking diode $D_5$ and inductor $L_1$, and its source connected directly to the ground-potential conductor 45. As indicated by the broken lines, the FET switch $Q_1$ has a diode $D_{q1}$ built into it.

The transformer secondary $N_2$ has its opposite extremities connected respectively to the pair of output terminals $10_a$ and $10_b$ via a rectifying and smoothing circuit 6. The rectifying and smoothing circuit 6 comprises a rectifying diode $D_0$ and a smoothing capacitor $C_0$. Connected between one extremity of the transformer secondary $N_2$ and the output terminal 10, the rectifying diode $D_0$ is so oriented as to be conductive when the switch $Q_1$ is off, and nonconductive when the switch $Q_1$ is on. The capacitor $C_0$ is connected in parallel with the transformer secondary $N_2$ via the diode $D_0$. A unidirectional output voltage is thus obtained between the pair of output terminals $10_a$ and $10_b$ for feeding a load 10 connected thereto. A flyback d.c.-to-d.c. converter is constituted of the smoothing capacitor $C_1$, transformer 5, switch $Q_1$, and rectifying and smoothing circuit 6.

The present invention particularly features au ancillary charging circuit 7 comprising, in addition to the aforesaid transformer ancillary winding $N_3$, a capacitor $C_2$, two diodes $D_6$ and $D_7$, and an inductor $L_2$. Connected between second rectifier output conductor 44 and smoothing capacitor $C_1$, the ancillary charging circuit 7 functions to put out an ancillary voltage to be added to the rectifier output voltage $V_4$ between second rectifier output conductor 44 and ground-potential conductor 45.

The transformer ancillary winding $N_3$ has one of its opposite extremities connected both to the transformer primary $N_1$ and to the smoothing capacitor $C_1$. The other extremity of the ancillary winding $N_3$ is connected to the second rectifier output conductor 44 via the capacitor $C_2$, inductor $L_2$ and diode $D_7$. The diode $D_6$ is connected in parallel with the ancillary winding $N_3$ via the capacitor $C_2$, which is connected between inductor $L_2$ and ancillary winding $N_3$. The anode of the diode $D_6$ is connected to the junction between capacitor $C_2$ and inductor $L_2$.

As shown also in FIG. 1, a switch control circuit 8 has inputs connected to the pair of output terminals $10_a$ and $10_b$ by way of conductors 11 and 12, respectively, and an output connected to the control terminal of the switch $Q_1$ by way of a conductor 13. The switch control circuit 8 is designed to turn the switch $Q_1$ on and off at a repetition frequency required to keep the d.c. output voltage between the pair of terminals $10_a$ and $10^b$ at a required value.

Figure 2:
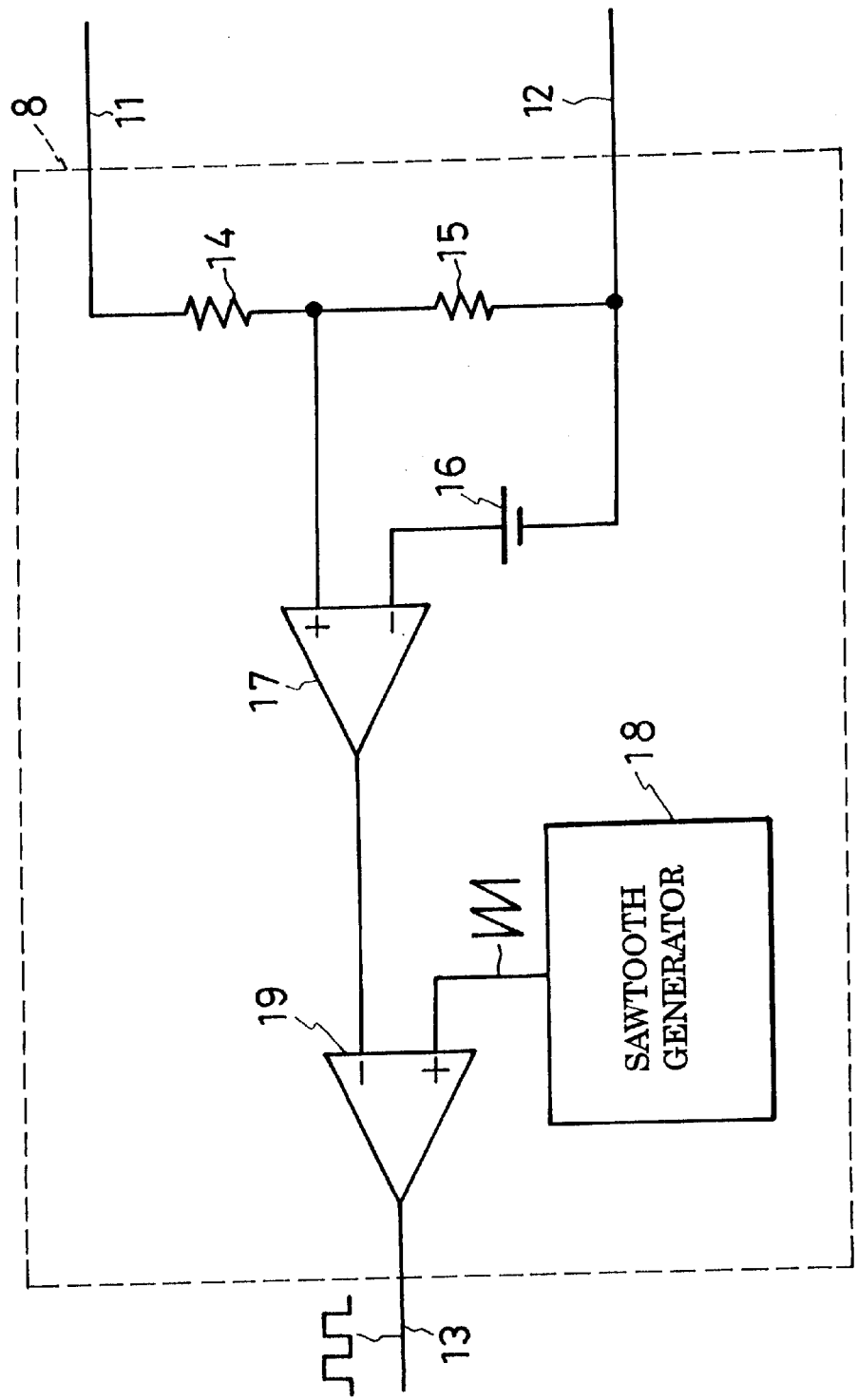
FIG. 2 is a schematic electrical diagram, partly in block form, showing in more detail the switch control circuit included in the FIG. 1 switching power supply.

FIG. 2 is a more detailed illustration of the switch control circuit 8. Included is a serial connection of two voltage dividing resistors 14 and 15 connected between the pair of input conductors 11 and 12. The junction between the resistors 14 and 15 is connected to one input of a differential amplifier 17, the other input of which is connected o a reference voltage source 16. The output of the differential amplifier 17 is connected to one input of a comparator 19, the other input of which is connected to a sawtooth generator circuit 18. The output of the comparator 19 is connected to the control terminal of the switch $Q_1$, FIG. 1, by way of the output conductor 13.

The sawtooth generator 19 puts out a sawtooth voltage with a frequency (e.g. 20 kHz) that is higher than the frequency (e.g. 50 Hz) of the a.c. voltage $V_{ac}$ between the pair of input terminals 1 and 2. Thus the comparator 19 puts out a series of duration-modulated switch control pulses $V_{g1}$ in synchronism with the sawtooth voltage, making on-off control of the switch $Q_1$ accordingly. As required or desired, the differential amplifier 17 and the comparator 19 may be coupled photoelectrically, as by the familiar combination of a light-emitting diode and a phototransistor, instead of directly as in FIG. 3. As another modification of the illustrated embodiment, the transformer 5 could be furnished with an additional winding in combination with an associated rectifier for providing the supply voltage needed by the switch control circuit 8.

Operation

In use of the FIG. 1 power supply the pair of a.c. input terminals 1 and 2 are to be connected to an unshown source of a.c. power. The smoothing capacitor $C_1$ will be charged to the desired d.c. voltage $V_{c1}$ as the switch $Q_1$ is turned on and off by the switch control circuit 8. The capacitor $C_2$ of the ancillary charging circuit 7 will be charged to the voltage $V_{c2}$ by the voltage across the transformer ancillary winding $N_3$. The resulting steady-state operation of this representative switching power supply will be discussed hereinbelow with reference to FIGS. 3 and 4 which show the voltage and current waveforms appearing in various parts of the FIG. 1 circuitry.

Figure 3:
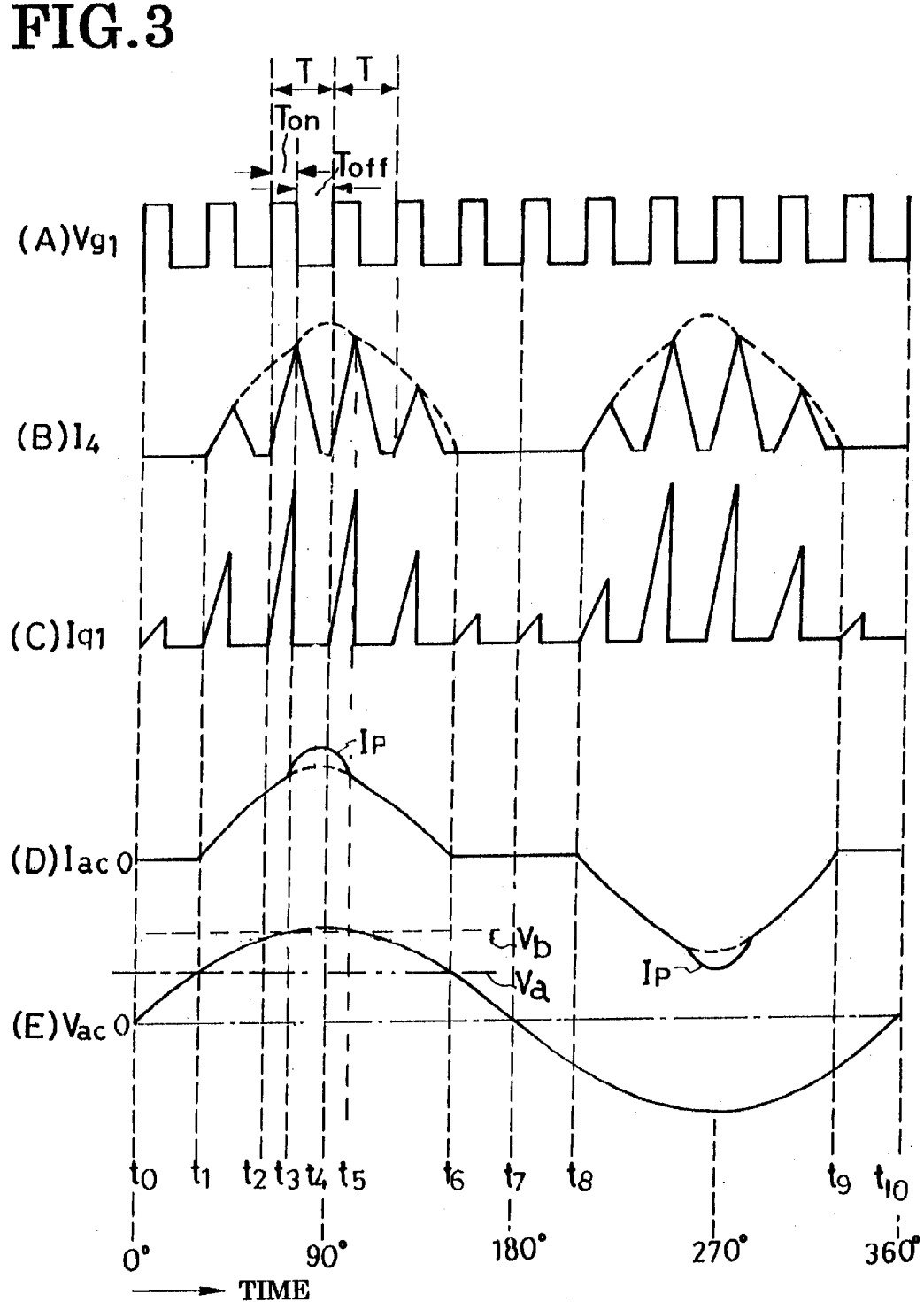
FIG. 3, consisting of (A) through (E), is a series of diagrams showing the voltage and current signals appearing in various parts of the FIG. 1 switching power supply.

At (A) in FIG. 3 is shown the series of switch control pulses $V_{g1}$ applied by the switch control circuit 8 to the control terminal of the switch $Q_1$ for its on-off control. The switch $Q_1$ is turned on and off during each cycle T of the switch control signal consisting of one pulse, as from $t_2$ to $t_3$, and one space between such pulses, as from $t_3$ to $t_4$. The repetition rate of these switch control pulses $V_{g1}$ is now assumed to be 20 kHz. It is also understood that the 50-Hz a.c. voltage $V_{ac}$ is now applied between the pair of a.c. input terminals 1 and 2 as at (E) in FIG. 3. As the switch $Q_1$ is repeatedly turned on and off, the amplitudes of the output current $I_4$ of the rectifier circuit 4 and the current $I_{q1}$ through the switch $Q_1$ will change, as at (B) and (C) in FIG. 3, in conformity with the amplitude of the a.c. input voltage $V_{ac}$. Thus the a.c. input current $I_{ac}$ shown at (D) in FIG. 3 will closely approximate a sinusoidal wave, with consequent improvement in power factor and waveform.

The rectifier output current $I_4$ shown at (B) in FIG. 3 is assumed to be the current flowing through the junction 48 between the diodes $D_1$ and $D_3$ of the rectifier circuit 4. The rectifier output current $I_4$ is therefore equal to the sum of the current $I_{L1}$ through the primary inductor $L_1$ and the current $I_{L2}$ through the ancillary inductor $L_2$.

It is to be noted that the primary inductor $L_1$ is connected to the tap 9 of the transformer primary $N_1$ via the reverse blocking diode $D_5$. As a result, even if the switch $Q_1$ is conductive, there is no flow of the primary inductor current $I_{L1}$ or of the a.c. input current $I_{ac}$ during $t_0$–$t_1$, $t_6$–$t_8$ and $t_9$–$t_{10}$ periods in FIG. 3 when the voltage at the transformer primary tap 9 due to the voltage $V_{c1}$ across the smoothing capacitor $C_1$ is higher than the rectifier output voltage $V_4$. The rectifier output current $I_4$ and a.c. input current $I_{ac}$ are both shown to flow from $t_1$ to $t_6$ and from $t_8$ to $t_9$ at (B) and (D) in FIG. 3.

The FIG. 1 power supply operates in three different modes depending upon the instantaneous value of the a.c. supply voltage $V_{ac}$ shown at (E) in FIG. 3. Let us consider the first 180 electrical degrees of this a.c. supply voltage $V_{ac}$. The power supply operation is in First Mode during the $t_0$–$t_1$ and $t_6$–$t_7$ periods when the a.c. supply voltage $V_{ac}$ is between 0 and first value $V_a$, in Second Mode during the $t_1$–$t_3$ and $t_5$–$t_6$ periods when the voltage $V_{ac}$ is between first value $V_a$ and second value $V_b$, and in Third Mode during the $t_3$–$t_5$ period when the voltage $V_{ac}$ is higher than the second value $V_b$. The negative half-cycle of the a.c. supply voltage $V_{ac}$, from $t_7$ to $t_{10}$ in FIG. 3, is inverted into the same shape as that of its positive half-cycle from $t_0$ to $t_7$ as the a.c. supply voltage is rectified by the rectifier circuit 4. The noted three modes of operation repeat themselves during the negative half-cycle. Also, in FIG. 3, the a.c. supply voltage $V_{ac}$ is shown to cross the second value level $V_b$ at the termination of one conducting period $T_{on}$ of the switch $Q_1$. This showing is by way of example only; in practice, the crossing moment may come at other than the end of each conducting period.

In First Mode of operation, as from $t_0$ to $t_1$ and from $t_6$ to $t_7$, the witch current $I_{q1}$ will flow as at (C) in FIG. 3 along the path comprising the smoothing capacitor $C_1$, transformer primary $N_1$, and switch $Q_1$ each time this switch closes. No energy release from the transformer 5 will occur on its output side during these periods because then the diode $D_0$ is nonconductive. Energy will therefore be stored on the transformer 5. The potential at the tap 9 of the transformer primary $N_1$ is now higher than that of the first rectifier output conductor 43, so that there will be no flow of current $I_{L1}$ through the primary inductor $L_1$. There will be no flow of current $I_{L2}$ through the ancillary inductor $L_2$, either, because the voltage $V_{C1}$ across the smoothing capacitor $C_1$ is now higher than the rectifier output voltage $V_4$.

The energy that has been stored as above on the transformer 5 will be released when the switch $Q_1$ subsequently goes off, with the consequent current flow along the path comprising the transformer secondary $N_2$, diode $D_0$, and capacitor $C_0$. The load 10 will therefore be powered even though the a.c. supply voltage $V_{ac}$ is now lower than from $t_1$ to $t_6$.

In Second Mode, as from $t_1$ to $t_3$ and from $t_3$ to $t_6$ in FIG. 3, the potential at the transformer primary tap 9 is less than that of the first rectifier output conductor 43. There will therefore be a flow of current $I_{L1}$ through the primary inductor $L_1$. When the switch $Q_1$ goes on, the current $I_{L1}$ will flow along the path comprising the first rectifier output conductor 43, primary inductor $L_1$, reverse-blocking diode $D_5$, transformer primary second part $N_{1b}$, switch $Q_1$, and ground-potential conductor 45. Current will also flow along the path comprising the smoothing capacitor $C_1$, transformer primary $N_1$, and switch $Q_1$. Thus the current $I_{q1}$ now flowing through the switch $Q_1$, shown at (C) in FIG. 3, is the sum of the currents flowing through the two paths just noted.

When the switch $Q_1$ is off, as from $t_3$ to $t_4$ in FIG. 3, in Second Mode, on the other hand, the current $I_{L1}$ will flow to charge the smoothing capacitor $C_1$, with energy release from the primary inductor $L_1$. There will also be a current flow through the diode $D_0$ of the rectifying and smoothing circuit 6 as a result of energy release from the transformer 5 and primary inductor $L_1$. The primary inductor current $I_{L1}$ will decrease in magnitude with the progress of the energy release from the transformer 5 and primary inductor $L_1$.

In Third Mode, as from $t_3$ to $t_5$ in FIG. 3, the a.c. input voltage $V_{ac}$ and the rectifier output voltage $V_4$ will be so high that both first and second ancillary diodes $D_6$ and $D_7$ will be conductive. Both primary inductor current $I_{L1}$ and ancillary inductor current $I_{L2}$ will then flow, as will be hereinafter explained in more detail with reference to FIG. 4.

Figure 4:
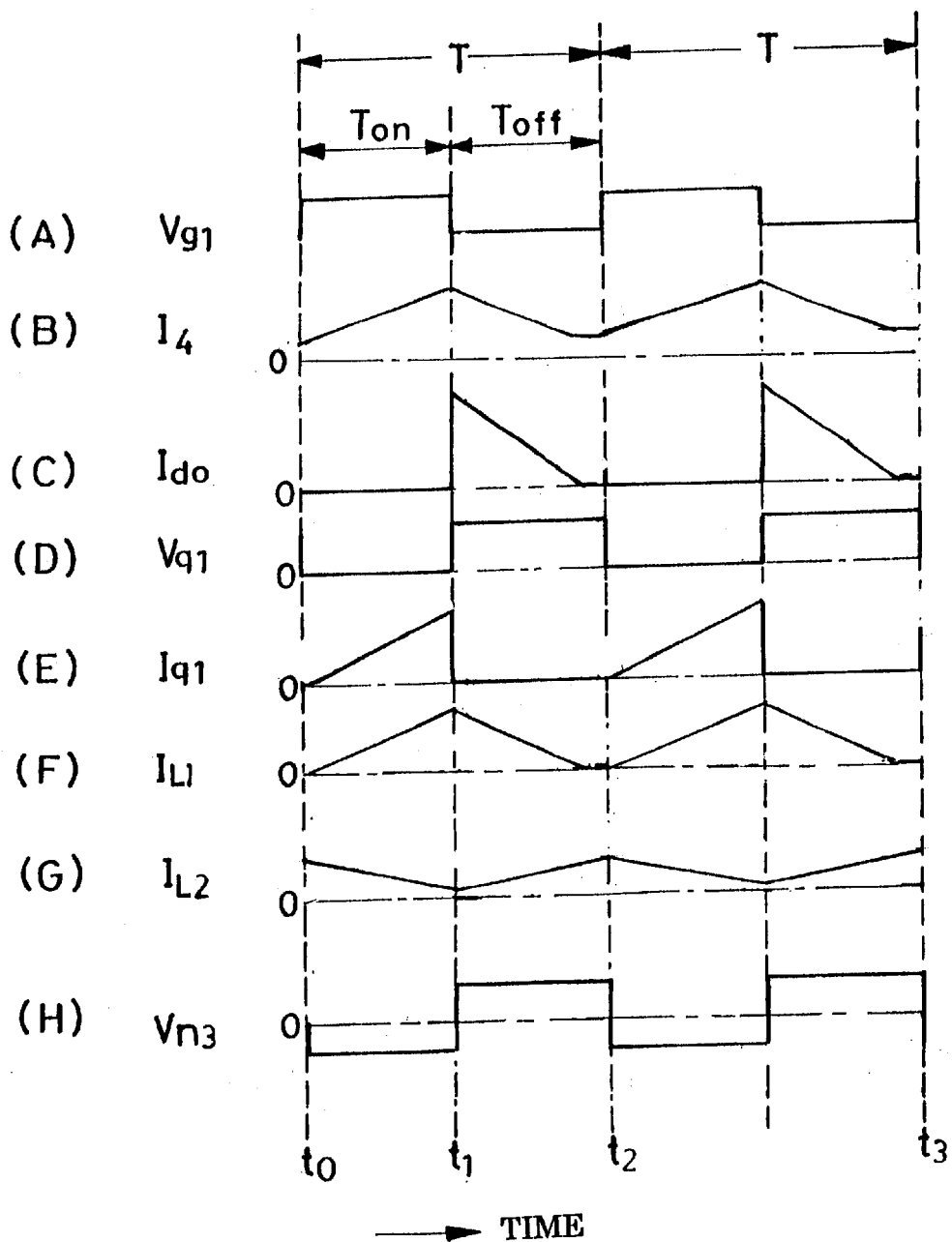
FIG. 4, consisting of (A) through (H), is a series of diagrams showing on a different time scale the voltage and current signals appearing in various parts of the FIG. 1 device.

When the switch $Q_1$ is on, as fro $t_0$ to $t_1$ in FIG. 4, in response to one of the switch control pulses shown at (A) in this figure, the primary inductor current $I_{L1}$ will flow as at (F) in FIG. 4 along the same path as in Second Mode. There will also be a current flow in the circuit comprising the smoothing capacitor $C_1$, transformer primary $N_1$, and switch $Q_1$. The switch current $I_{q1}$, FIG. 4(E), is the sum of the primary inductor current $I_{L1}$ and the current discharged by the smoothing capacitor $C_1$. Also, during the conducting period $T_{on}$ of the switch $Q_1$, there will be obtained across the transformer ancillary winding $N_3$ a voltage $V_{n3}$ depending upon the ratio of the turns of the transformer primary $N_1$ and ancillary $N_3$. This voltage $V_{n3}$ is oriented to forwardly bias the first ancillary diode $D_6$, so that current will flow in the closed circuit comprising the transformer ancillary winding $N_3$, ancillary capacitor $C_2$, and first ancillary diode $D_6$. The capacitor $C_2$ will be charged with the polarity indicated in FIG. 1, with the consequent development of a voltage $V_{C2}$ across the same.

As will be noted from (G) in FIG. 4, there has been a sustained flow of current $I_{L2}$ through the ancillary inductor $L_2$ during the nonconducting period of the switch $Q_1$ preceding the $t_0$–$t_1$ conducting period $T_{on}$ of FIG. 4. This ancillary inductor current $I_{L2}$ will gradually decrease in magnitude during the $t_0$–$t_1$ period because then the anode potential of the first ancillary diode $D_6$ is higher than that during each nonconducting period $T_{off}$ of the switch $Q_1$. The ancillary inductor current $I_{L2}$ will flow during this conducting period $T_{on}$ along the path comprising the first a.c. input terminal 1, filter 3, first diode $D_1$, second ancillary diode $D_7$, ancillary inductor $L_2$, first ancillary diode $D_6$, smoothing capacitor $C_1$, fourth diode $D_4$, filter 3, and second a.c. input terminal 2. The ancillary inductor current $I_{L2}$ will increase in magnitude with the a.c. input voltage $V_{ac}$.

Then, during the ensuing nonconducting period $T_{off}$ of the switch $Q_1$, as from $t_1$ to $t_2$ in FIG. 4, the smoothing capacitor $C_1$ will be charged by the primary inductor current $I_{L1}$ as in Second Mode, and the current $I_{do}$ will flow through the output side diode $D_0$ as at (C) in FIG. 4. Further, as the transformer secondary $N_2$ will be clamped by the voltage $V_0$ across the capacitor $C_0$, a voltage $V_{N3}$ will develop across the transformer ancillary $N_3$ as at (H) in FIG. 4. The transformer ancillary voltage $V_{N3}$ during the nonconducting period $T_{off}$ is opposite in polarity to the smoothing capacitor voltage $V_{C1}$, so that the potential at the right-hand extremity, as viewed in FIG. 1, of the ancillary inductor $L_2$ will be less than that during the conducting period.

The ancillary inductor current $I_{L2}$ will rise gradually in magnitude during the nonconducting period $T_{off}$. The ancillary inductor current $I_{L2}$ will flow along the path comprising the first a.c. input terminal 1, filter 3, first diode $D_1$, second ancillary diode $D_7$, ancillary inductor $L_2$, ancillary capacitor $C_2$, transformer ancillary $N_3$, smoothing capacitor $C_1$, fourth diode $D_4$, filter 3, and second a.c. input terminal 2, charging the smoothing capacitor $C_1$ in so doing. The smoothing capacitor $C_1$ is charged by both primary inductor current $I_{L1}$ and ancillary inductor current $I_{L2}$. It will therefore be appreciated that the smoothing capacitor $C_1$ is charged to the voltage $V_{C1}$ that is higher than if, as has been the case heretofore, it is charged only by the primary inductor current $I_{L1}$. The current $I_4$ through the rectifier circuit 4, shown at (B) in FIG. 4, is the sum of the primary and ancillary inductor currents $I_{L1}$ and $I_{L2}$, (F) and (G) in FIG. 4.

Incidentally, FIG. 4 is meant purely to illustrate how the current and voltage signals in question change with time. Their amplitudes are shown greatly simplified or idealized.

The advantages gained by this particular embodiment of the invention may be recapitulated as follows:

1. The smoothing capacitor $C_1$ is charged not only by the known circuit comprising the rectifier circuit 4, primary inductor $L_1$, reverse-blocking diode $D_5$, and transformer primary first part $N_{1a}$, but by the novel charging circuit 7 constituting a feature of the invention. If the smoothing capacitor is to be charged in the FIG. 1 circuitry to the same voltage as heretofore, the current $I_{L1}$ flowing through the primary inductor $L_1$ can be of smaller magnitude than in the prior art charging circuit. Not only can the primary inductor $L_1$ be reduced in size, but also power loss is lessened here for higher overall efficiency of the power supply. The primary inductor current $I_{L1}$ may be reduced, of course, only to such a level that the desired improvements in input current waveform and power factor does not become unattainable. The ancillary charging circuit has its power loss. Yet the current flowing through this circuit for charging the smoothing capacitor $C_1$ is only of such magnitude that the resulting power loss is a small or negligible. Altogether, the switching power supply according to the invention posses a decisive advantage over the prior art in terms of efficiency in operation and compactness in size.

2. If the current flowing through the primary inductor $L_1$ for charging the smoothing capacitor $C_1$ is of the same magnitude as heretofore, on the other hand, then the smoothing capacitor will be charged to the voltage $V_{C1}$ that is higher than heretofore by the amount charged by the ancillary charging circuit 7. Such higher smoothing capacitor voltage $V_{C1}$ will be effective to restrict the peaks of the current flowing into the smoothing capacitor $C_1$ at or adjacent the peaks of the rectifier output voltage $V_4$, resulting in the reduction of the higher harmonics of the a.c. input current $I_{ac}$.

3. Since the primary inductor $L_1$ is connected to the tap 9 on the transformer primary $N_1$, the current $I_{L1}$ does not flow through the primary inductor even when the switch $Q_1$ is on, unless the potential at the first rectifier output conductor 43 goes higher than that of the tap 9. No primary inductor current $I_{L1}$ will flow during the $t_0$–$t_1$, $t_6$–$t_8$ and $t_9$–$t_{10}$ periods of FIG. 3. Although this is unadvantageous for waveform and power factor improvements, it is also true that no power loss occurs at the primary inductor $L_1$ as long as no current flow therethrough. The best compromise may be achieved through positional adjustment of the tap 9 on the transformer primary $N_1$.

4. The second ancillary diode $D_7$ functions to block reverse current flow from ancillary charging circuit 7 toward primary inductor $L_1$. The primary inductor current $I_{L1}$ is reduced in this respect, too, for further curtailment of power loss.

Figure 5:
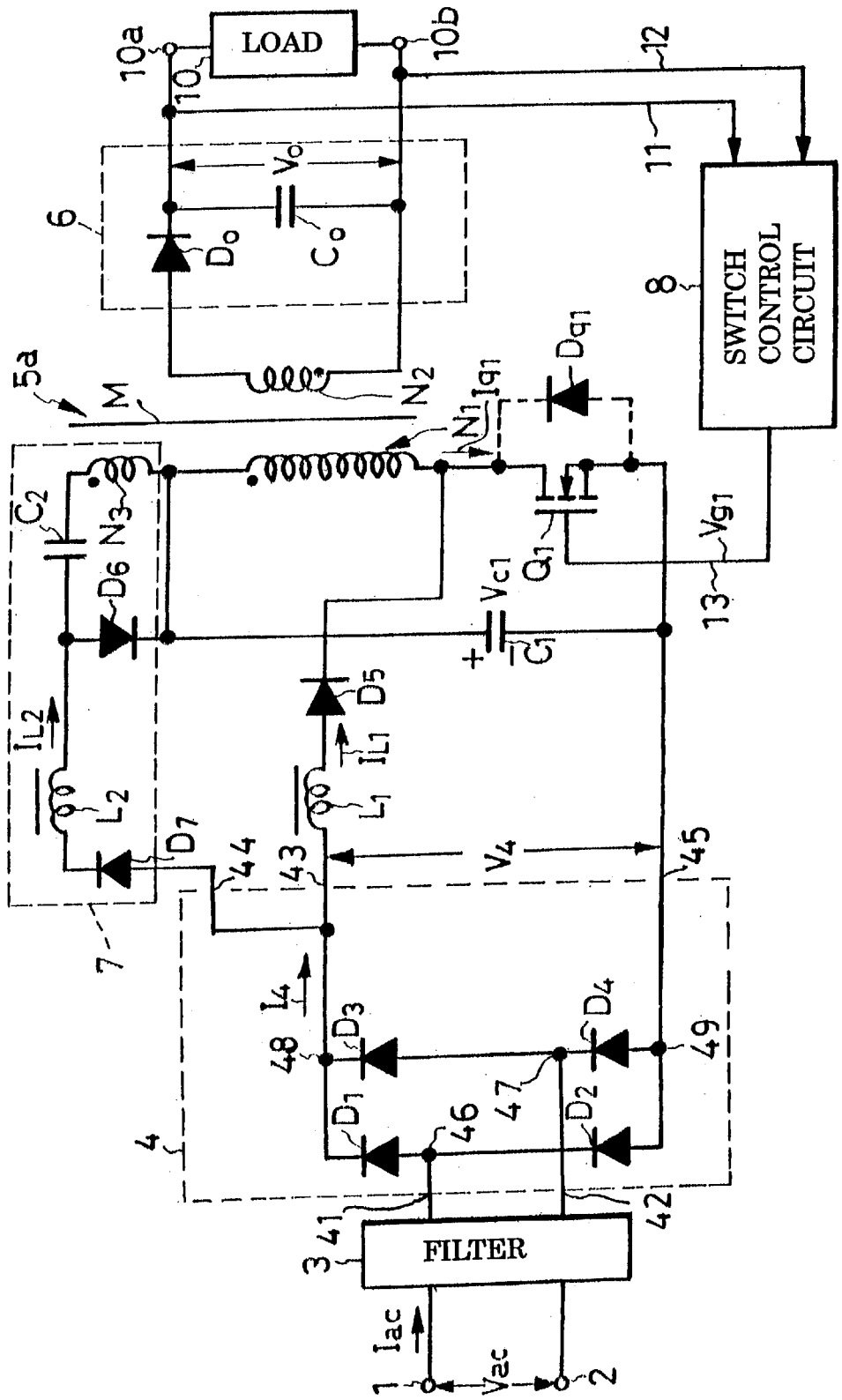
FIG. 5 is a view similar to FIG. 1 but showing a second preferred form of switching power supply according to the invention.

Embodiment of FIG. 5

The second preferred form of switching power supply includes a transformer $5_a$ having no tap on its primary winding $N_1$. The primary inductor $L_1$ is connected via the reverse-blocking diode $D_5$ to the junction between transformer primary $N_1$ and switch $Q_1$. All the other details of construction are as set forth above with reference to FIGS. 1 and 2.

When the switch $Q_1$ is turned on, the reverse-blocking diode $D_5$ will conduct irrespective of the voltage across the transformer primary $N_1$. The primary inductor current $I_{L1}$ will flow along the path comprising the first rectifier output conductor 43, primary inductor $L_1$, reverse-blocking diode $D_5$, switch $Q_1$, and ground-potential conductor 45. In this second embodiment, therefore, the primary inductor current $I_{L1}$ flows during the $t_0$–$t_1$, $t_6$–$t_8$, and $t_9$–$t_{10}$ periods of FIG. 4, when the a.c. input voltage $V_{ac}$ is less in instantaneous value than $V_a$, as long as the switch $Q_1$ is on. Consequently, the FIG. 5 embodiment is better in waveform and power factor than that of FIG. 1.

Offsetting this advantage is an increase in power loss at the primary inductor $L_1$ as a result of the fact that the primary inductor current $I_{L1}$ flows throughout the nearly complete cycle of the a.c. supply voltage $V_{ac}$. Use of the FIG. 1 device is recommended for higher efficiency, and of the FIG. 5 device for better waveform and higher power factor. Both devices are nevertheless alike in having the ancillary charging circuit 7 constituting the gist of this invention.

Figure 6:
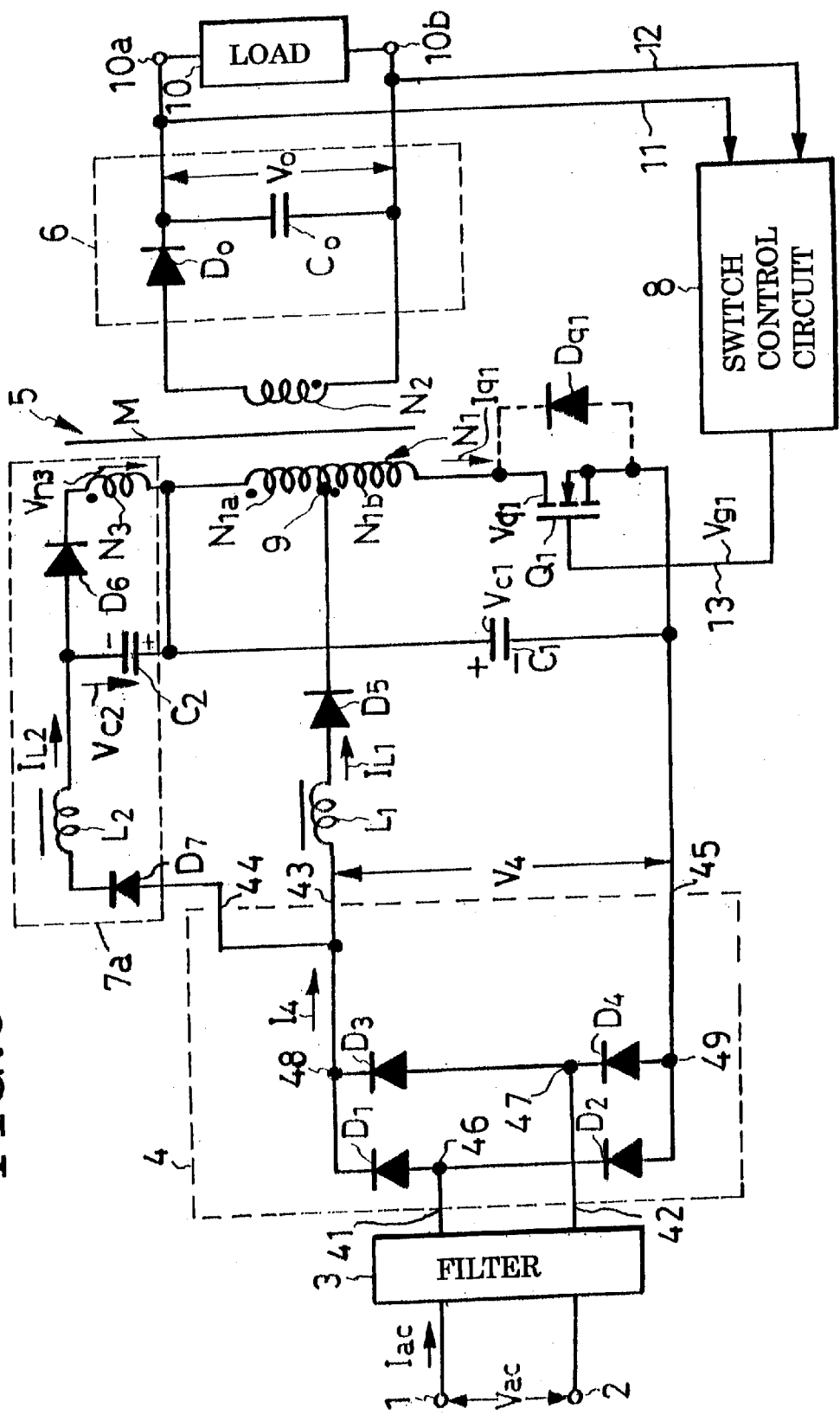
FIG. 6 is also a view similar to FIG. 1 but showing a third preferred form of switching power supply according to the invention.

Embodiment of FIG. 6

This switching power supply employs a modified ancillary charging circuit $7_a$ in place of its FIGS. 1 and 5 counterpart 7 but is identical with the FIG. 1 device in all the other details of construction. The alternate ancillary charging circuit $7_a$ has the first ancillary diode $D_6$ connected between ancillary inductor $L_2$ and transformer ancillary winding $N_3$, and the ancillary capacitor $C_2$ connected between ancillary inductor $L_2$ and smoothing capacitor $C_1$. All the other details of construction are as previously set forth in connection with the FIG. 1 ancillary charging circuit 7.

The voltage that builds up across the transformer ancillary winding $N_3$ during the conducting periods of the switch $Q_1$ is oriented to reversely bias the first ancillary diode $D_6$. There will therefore be no current flow through the ancillary diode $D_6$ that would charge the ancillary capacitor $C_2$. A voltage capable of forwardly biasing the ancillary diode $D_6$ will develop across the transformer ancillary $N_3$ during the nonconducting periods of the switch $Q_1$, so that a closed circuit of the transformer ancillary $N_3$, ancillary capacitor $C_2$, and diode $D_6$ will be completed for the flow of current charging the ancillary capacitor $C_2$.

If the voltage drop across the second ancillary diode $D_7$ is disregarded, the voltage between the input-side terminal of the ancillary inductor $L_2$ and the ground-potential conductor 45 is equal to the rectifier output voltage $V_4$. The voltage between the output-side terminal of the ancillary inductor $L_2$ and the ground-potential conductor 45 is equal to the difference between the voltage $V_{c1}$ across the smoothing capacitor $C_1$ and the voltage $V_{c2}$ across the ancillary capacitor $C_2$. Thus the voltage $V_{L2}$ across the ancillary inductor $L_2$ is defined as:

$$V_{L2}=V_4-(V_{c1}-V_{c2})=V_4-V_{c1}+V_{c2}.$$

It is thus seen that the ancillary inductor current $I_{L2}$ flows only when the sum of $V_4$ and $V_{c2}$ is greater than $V_{c1}$. As in the first disclosed embodiment of the invention, the smoothing capacitor $C_1$ is charged both by the current $I_{L1}$ through the primary inductor $L_1$ and by the current $I_{L2}$ through the ancillary inductor $L_2$, to the voltage $V_{c1}$ that is higher than in the prior art.

Figure 7:
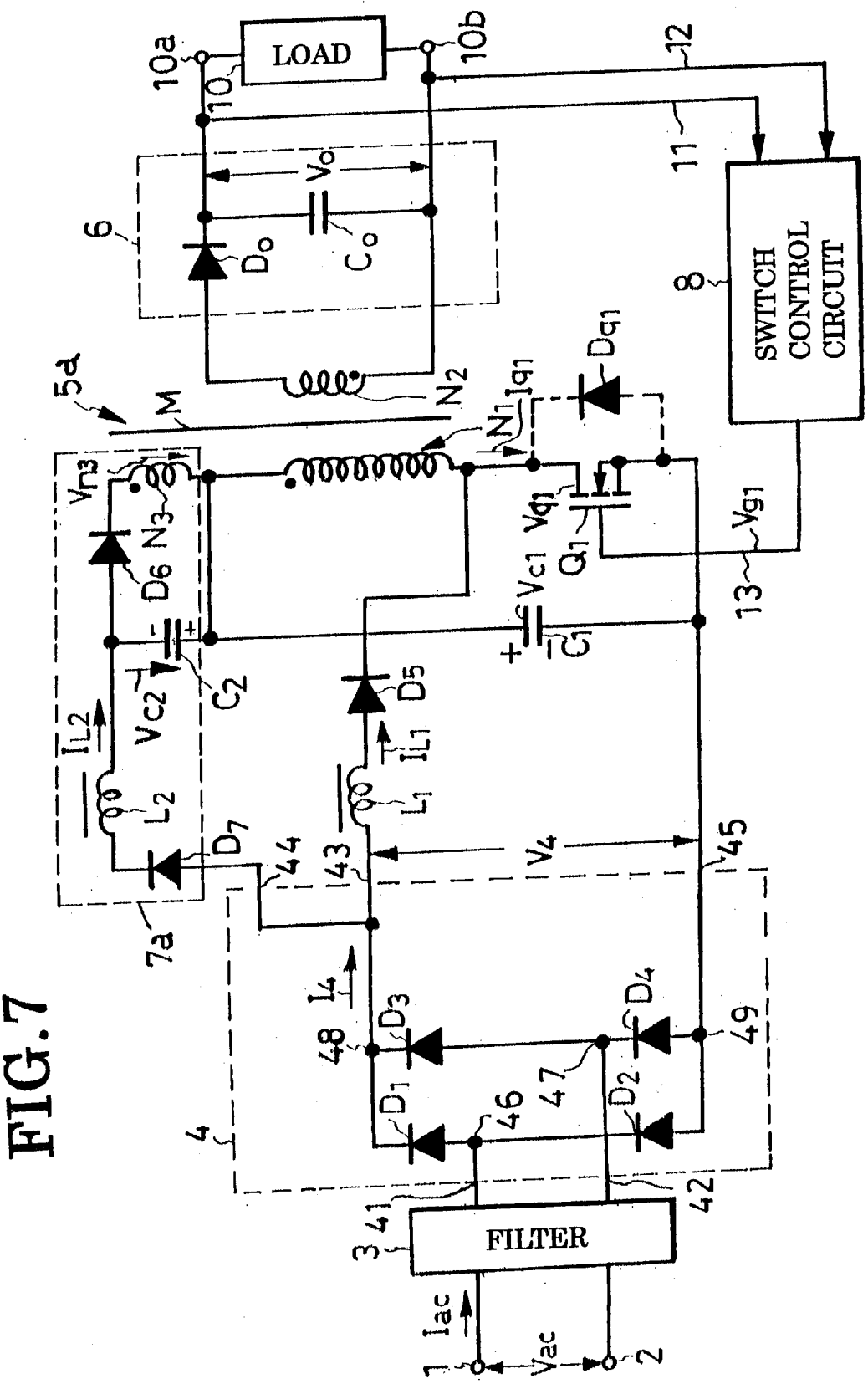
FIG. 7 is also a view similar to FIG. 1 but showing a fourth preferred form of switching power supply according to the invention.

Embodiment of FIG. 7

The transformer 5 of the FIG. 6 switching power supply is replaceable by the transformer $5_a$ of the FIG. 5 device. FIG. 7 is an illustration of the resulting device, in which the primary inductor $L_1$ is connected via the reverse-blocking diode $D_5$ to the junction between transformer primary $N_1$ and switch $Q_1$ as in FIG. 5. This device gains the same advantages as do the FIGS. 5 and 6 embodiments.

Figure 8:
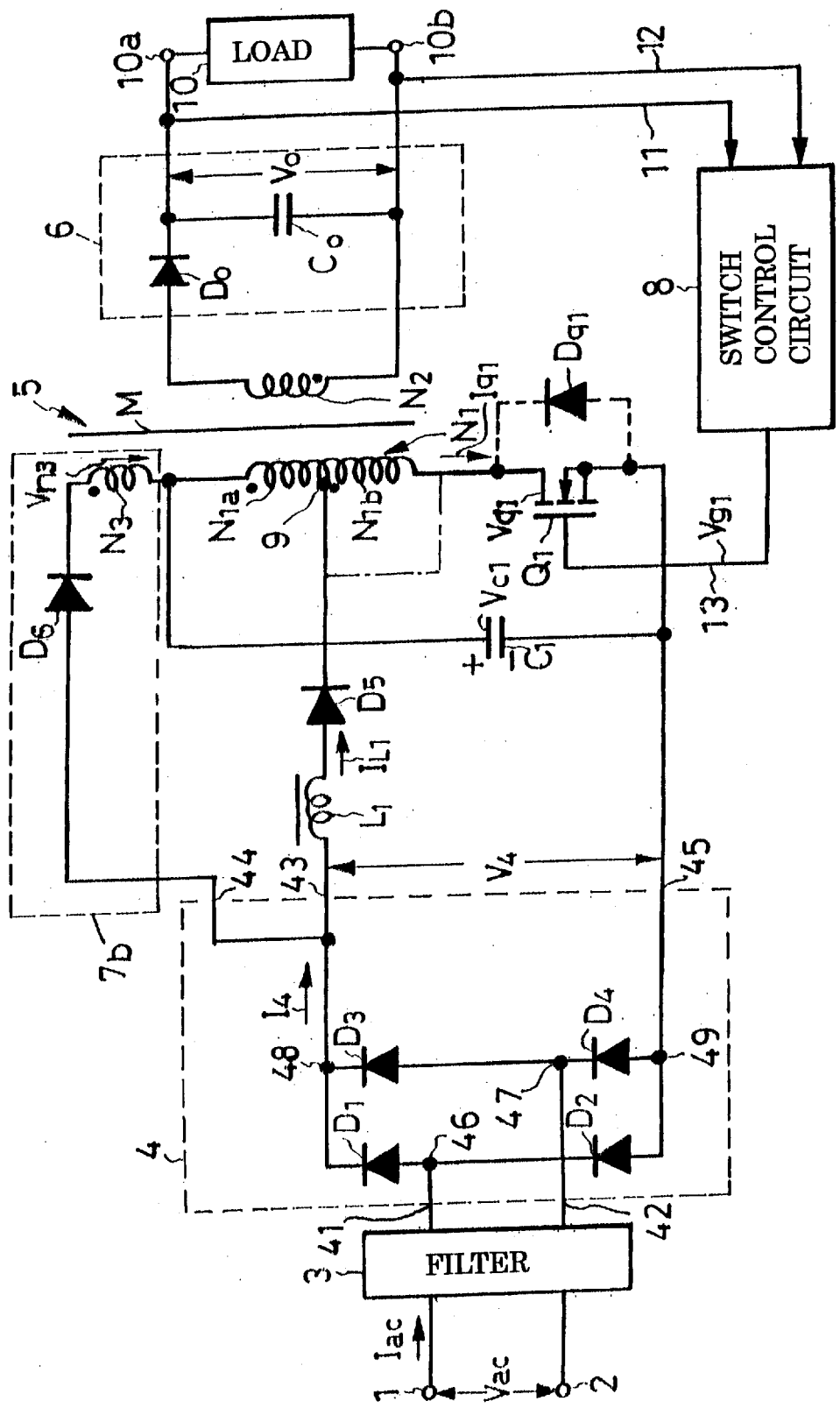
FIG. 8 is also a view similar to FIG. 1 but showing a fifth preferred form of switching power supply according to the invention.

Embodiment of FIG. 8

The ancillary charging circuit $7_b$ is additionally modifiable as shown at $7_b$ in FIG. 8, which shows a further preferred embodiment of the invention that is similar in all the other respects to that of FIG. 6. The modified ancillary charging circuit $7_b$ has only the transformer ancillary winding $N_3$ and ancillary diode $D_6$. Connected between the second rectifier output conductor 44 and smoothing capacitor $C_1$ via the ancillary diode $D_6$, the transformer ancillary $N_3$ is assumed to possess leakage inductance.

During the nonconducting periods of the switch $Q_1$, there will develop across the transformer ancillary $N_3$ a voltage $V_{n3}$ that is oriented to forwardly bias the ancillary diode $D_6$. Current will flow through the ancillary diode $D_6$, charging the smoothing capacitor $C_1$, only when the sum of the rectifier output voltage $V_4$ and the transformer ancillary voltage $V_{n3}$ grows higher than the voltage $V_{c1}$ across the smoothing capacitor $C_1$.

This FIG. 8 embodiment offers the same advantages as does that of FIG. 6 except for the lack of smoothing effects by the reactor $L_1$ and capacitor $C_2$ of the FIG. 6 ancillary charging circuit $7_a$. Counterbalancing this shortcoming are the simplicity in construction and compactness in size of the ancillary charging circuit $7_b$.

The FIG. 8 ancillary charging circuit $7_b$ lends itself to use with the transformer $5_a$ of FIGS. 5 and 7. To this end, as indicated by the broken line in FIG. 8, the cathode of the reverse-blocking diode $D_5$ may be connected to the junction between transformer primary $N_1$ and switch $Q_1$ instead of to the tap 9.

Figure 9:
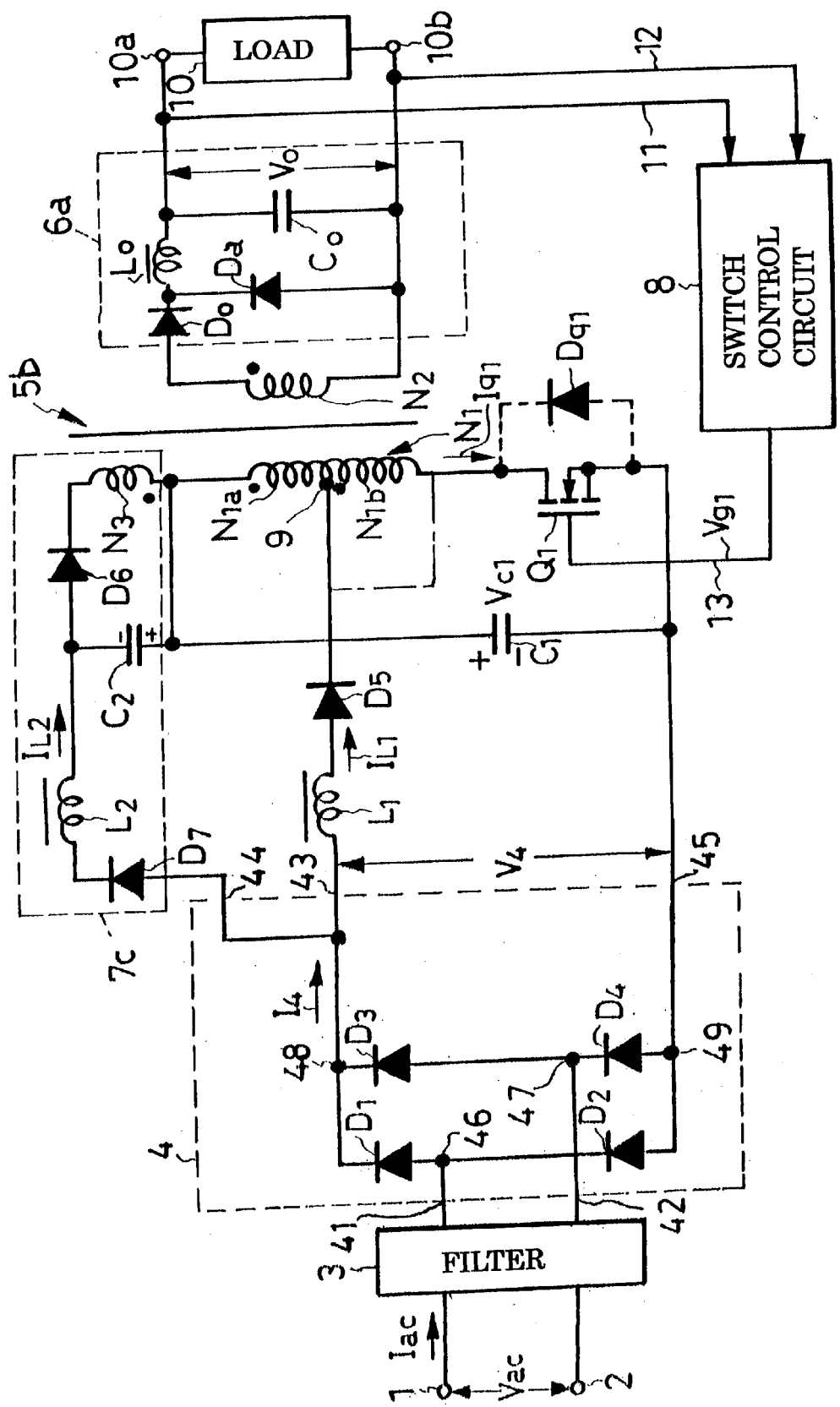
FIG. 9 is also a view similar to FIG. 1 but showing a sixth preferred form of switching power supply according to the invention.

Embodiment of FIG. 9

The switching power supply of FIG. 9 is similar to that of FIG. 6 except that a further modified transformer $5_b$, a further modified ancillary charging circuit $7_c$, and a modified rectifying and smoothing circuit $6_a$ are used in place of the transformer 5, ancillary charging circuit $7_a$, and rectifying and smoothing circuit 6, respectively, of the FIG. 6 embodiment.

The FIG. 9 transformer $5_b$ is similar to the FIG. 6 transformer 5 except that, as indicated by the dots in FIG. 9, the secondary winding $N_2$ and ancillary winding $N_3$ are both opposite in polarity to their FIG. 6 counterparts. The FIG. 9 ancillary charging circuit $7_c$ differs from the FIG. 6 ancillary charging circuit $7_a$ in the polarity of the transformer ancillary winding $N_3$. The FIG. 9 rectifying and smoothing circuit $6_a$ differs from the FIG. 6 rectifying and smoothing circuit 6 in additionally comprising a choke or a smoothing inductor $L_0$ and a smoothing diode $D_a$. The smoothing inductor $L_0$ is connected between rectifying diode $D_0$ and smoothing capacitor $C_0$. Generally known as commutating diode, the smoothing diode $D_a$ is connected n parallel with the serial connection of inductor $L_0$ and capacitor $C_0$. A forward d.c.-to-d.c. converter is constituted of the smoothing capacitor $C_1$, transformer $5_b$, switch $Q_1$, and rectifying and smoothing circuit $6_a$.

In the FIG. 9 switching power supply, as in the conventional forward converter, the diode $D_0$ will be forward biased by the voltage developing across the transformer secondary $N_2$ during the conducting periods of the switch $Q_1$, with the consequent charging of the capacitor $C_0$. The ancillary capacitor $C_2$ will also be charged by the voltage developing across the transformer ancillary $N_3$ during the conducting periods of the switch $Q_1$.

In short the FIG. 9 device operates the same way as that of FIG. 6 except for how the ancillary capacitor $C_2$ and the output smoothing capacitor $C_0$ are charged, gaining the same advantages therewith. It will also be apparent that the FIG. 9 device is modifiable to include the transformer $5_a$ of FIGS.

5 and 7, by the cathode of the reverse-blocking diode $D_5$ may be connected to the junction between transformer primary $N_1$ and switch $Q_1$, as indicated by the broken line in FIG. 9, instead of to the tap 9. An additional possible modification of the FIG. 9 embodiment is the omission of the capacitor $C_2$, inductor $L_2$ and second diode $D_7$ from the ancillary charging circuit $7_c$.

Figure 10:
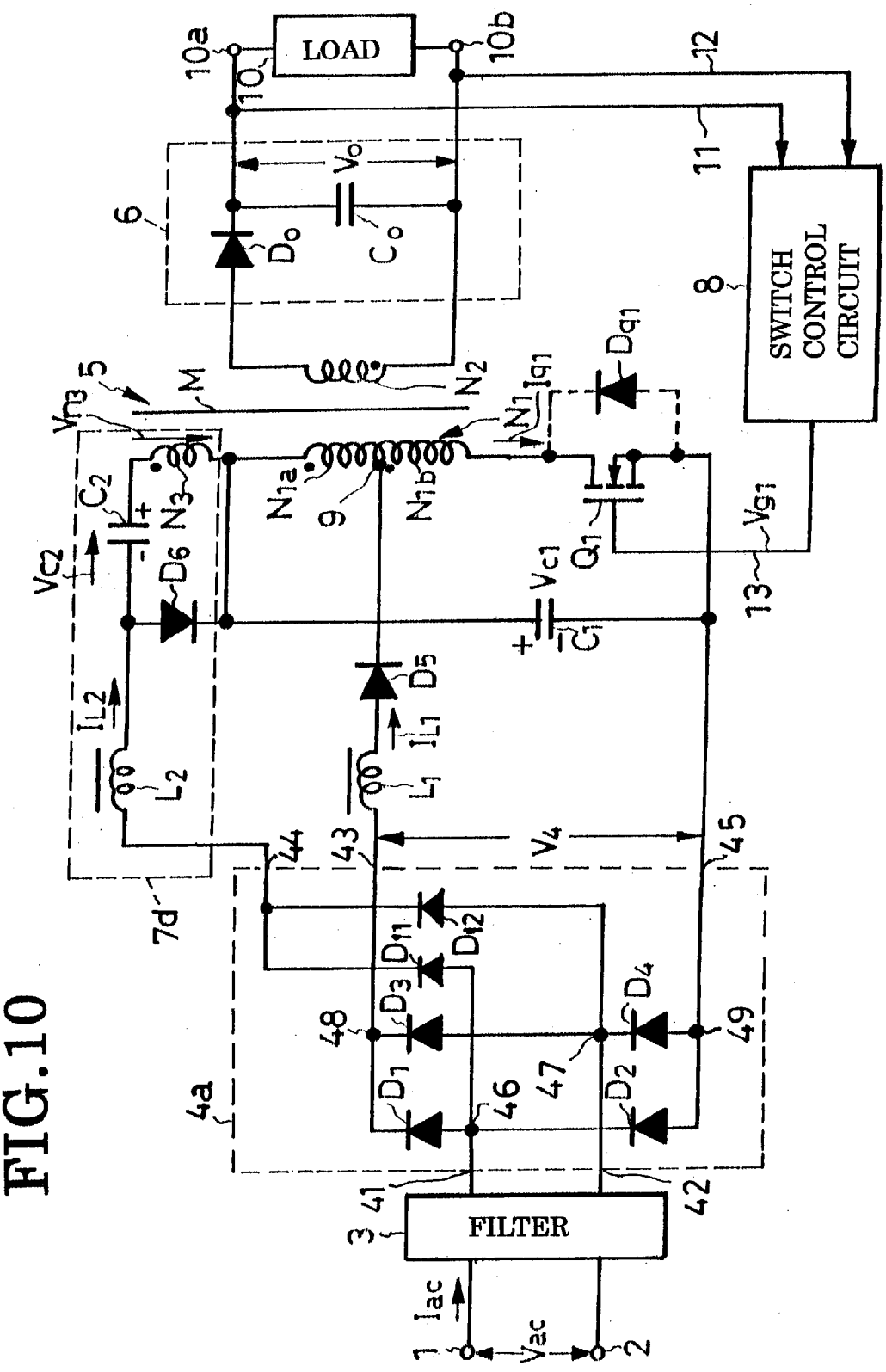
FIG. 10 is also a view similar to FIG. 1 but showing a seventh preferred form of switching power supply according to the invention.

Embodiment of FIG. 10

The switching power supply is here shown comprising a modified rectifier circuit $4a$ and modified ancillary charging circuit $7_d$ in places of the rectifier circuit 4 and ancillary charging circuit 7, respectively, of the FIG. 1 embodiment and is identical therewith in all the other respects. The modified rectifier circuit $4a$ has two diodes $D_{11}$ and $D_{12}$ in addition to the four noted diodes $D_1$–$D_4$. The fifth diode $D_{11}$ has its anode connected to the first a.c. input conductor 41, and its cathode to the second rectifier output conductor 44. The sixth diode $D_{12}$ has its anode connected to the second a.c. input conductor 42, and its cathode to the second rectifier output conductor 44. The second rectifier output conductor 44 is therefore supplied not with the outputs from the first and third diodes $D_1$ and $D_3$ but with the outputs from fifth and sixth diodes $D_{11}$ and $D_{12}$. These diodes $D_{11}$ and $D_{12}$ are substantially equal in electrical characteristics to the diodes $D_1$ and $D_3$, so that the voltage between second rectifier output conductor 44 and ground-potential conductor 45 is substantially equal to the voltage $V_4$ between first rectifier output conductor 43 and ground-potential conductor 45.

The modified ancillary charging circuit $7_d$ is similar to the FIG. 1 ancillary charging circuit 7 except for the absence of the diode $D_7$. The modified circuit $7_d$ will nevertheless function just like the original circuit 7 as the two additional diodes $D_{11}$ and $D_{12}$ of the rectifier circuit $4_a$ serve to block reverse current flow. It is understood that the diodes $D_{11}$ and $D_{12}$ are high-frequency diodes capable of responding to changes in the current through the ancillary inductor $L_2$ with the repeated conduction and non-conduction of the switch $Q_1$. The omission of the diode $D_7$ is inadvisable in cases where low-frequency diodes are used at $D_{11}$ and $D_{12}$.

POSSIBLE MODIFICATIONS

Notwithstanding the foregoing detailed disclosure, it is not desired that the present invention be limited by the exact showing of the drawings or the description thereof. The following, then, is a brief list of possible modifications or alterations of the illustrated embodiments which are all considered to fall within the scope of the invention:

1. All the ancillary charging circuits 7, $7_a$–$7_d$ could do without the second ancillary diode $D_7$. In the absence of the second ancillary diode $D_7$ the a.c. input current $I_{ac}$ would flow during the $t_0$–$t_1$, $t_6$–$t_8$ and $t_9$–$t_{10}$ periods of FIG. 3 as well.

2. All the illustrated switching power supplies could be incorporated with means for zero-voltage or -current switching for the switch $Q_1$.

3. A high-frequency capacitor, with a capacitance less than that of the smoothing capacitor $C_1$, could be connected between first rectifier output conductor 43 and ground-potential conductor 45 in all the illustrated switching power supplies. Such a capacitor would provide a bypass around the rectifier circuit 4 for the current that conventionally flowed along the path comprising the primary inductor $L_1$, reverse-blocking diode $D_5$, transformer primary first part $N_{1a}$, smoothing capacitor $C_1$, and rectifier circuit 4 during the nonconducting periods of the switch $Q_1$. The bypass capacitor would thus serve to reduce noise due to the diodes $D_1$–$D_4$ of the rectifier circuit 4.

4. An autotransformer could be used in places of the transformers 5, $5_a$ and $5_b$.

5. The reverse-blocking diode $D_5$ could be connected between first rectifier output conductor 43 and primary inductor $L_1$, or omitted in cases where reverse current flow would present no problem.

6. An insulated-gate bipolar transistor and other semiconductor switches could be used in place of the FET switch $Q_1$.

What is claimed is:

1. A switching power supply capable of translating a.c. voltage into d.c. voltage, comprising:
   (a) a pair of a.c. input terminals for inputting a.c. voltage having a known frequency;
   (b) a pair of d.c. output terminals for outputting d.c. voltage;
   (c) a rectifier circuit connected to the pair of input terminals for rectifying the a.c. input voltage, the rectifier circuit having a first output conductor for outputting a first rectifier output voltage, a second output conductor for outputting a second rectifier output voltage which is substantially the same as the first rectifier output voltage, and a third output conductor;
   (d) a transformer having a primary winding;
   (e) a rectifying and smoothing circuit connected between the transformer and the pair of d.c. output terminals for providing the d.c. output voltage;
   (f) an inductor for improvement of the power factor of the input terminals;
   (g) a smoothing capacitor connected between the first output conductor and the third output conductor of the rectifier circuit via at least part of the primary winding and the inductor;
   (h) a switch connected between the first output conductor and the third output conductor of the rectifier circuit via at least the inductor, and in parallel with the smoothing capacitor via the primary winding;
   (i) a switch control circuit connected to the switch for on-off control of the switch at a repetition frequency higher than the frequency of the a.c. input voltage; and
   (j) an ancillary charging circuit having an ancillary winding electromagnetically coupled with the primary winding of the transformer, the ancillary winding being connected between the second output conductor of the rectifier circuit and the smoothing capacitor.

2. The switching power supply of claim 1 wherein the ancillary charging circuit further comprises:
   (a) an ancillary capacitor connected to one extremity of the ancillary winding, another extremity of which is connected to the primary winding of the transformer and to the smoothing capacitor;
   (b) an ancillary diode connected in parallel with the ancillary winding via the ancillary capacitor; and
   (c) an ancillary inductor connected between the second output conductor of the rectifier circuit and a junction between the ancillary capacitor and the ancillary diode.

3. The switching power supply of claim 2 wherein the ancillary charging circuit further comprises a second ancillary diode connected in series with the ancillary inductor.

4. The switching power supply of claim 1 wherein the ancillary charging circuit further comprises:

(a) an ancillary diode connected to one extremity of the ancillary winding, another extremity of which is connected to the primary winding of the transformer and to the smoothing capacitor;

(b) an ancillary capacitor connected in parallel with the ancillary winding via the ancillary diode; and (c) an ancillary inductor connected between the second output conductor of the rectifier circuit and a junction between the ancillary diode and the ancillary capacitor.

5. The switching power supply of claim 4 wherein the ancillary charging circuit further comprises a second ancillary diode connected in series with the ancillary inductor.

6. The switching power supply of claim 1 further comprising a reverse-blocking diode connected in series with the inductor.

7. The switching power supply of claim 1 wherein the primary winding of the transformer is tapped to provide two divisions, wherein the inductor and one of the divisions of the transformer primary winding and the switch form a serial circuit, which serial circuit is connected between the first output conductor and the third output conductor of the rectifier circuit, and wherein the smoothing capacitor is connected in parallel with a serial circuit of both divisions of the transformer primary winding and the switch.

8. The switching power supply of claim 1 wherein the complete transformer primary winding forms a serial circuit with the inductor and the smoothing capacitor, which serial circuit is connected between the first output conductor and the third output conductor of the rectifier circuit, and wherein a serial circuit of the complete transformer primary winding and the switch is connected in parallel with the smoothing capacitor.

9. The switching power supply of claim 1 wherein the transformer has a secondary winding electromagnetically coupled to the primary winding, and wherein the rectifying and smoothing circuit comprises:

(a) a rectifying device connected to the secondary winding of the transformer and adapted to be made conductive by a voltage developing across the transformer secondary winding during nonconductive periods of the switch; and (b) an additional capacitor connected in parallel with the transformer secondary winding via the rectifying device.

10. The switching power supply of claim 1 wherein the transformer has a secondary winding electromagnetically coupled to the primary winding, and wherein the rectifying and smoothing circuit comprises:

(a) a rectifying device connected to the secondary winding of the transformer and adapted to be made conductive by a voltage developing across the transformer secondary winding during conductive periods of the switch; and (b) an additional capacitor connected in parallel with the transformer secondary winding via the rectifying device.

11. The switching power supply of claim 1 wherein the rectifier circuit comprises:

(a) a first diode having a first electrode connected to a first input conductor of the rectifier circuit;

(b) a second diode having a first electrode connected to the third output conductor of the rectifier circuit, and a second electrode connected to the first input conductor of the rectifier circuit;

(c) a third diode having a first electrode connected to a second input conductor of the rectifier circuit, and a second electrode connected to a second electrode of the first diode, with a junction between the second electrodes of the first and the third diode being connected to the first and the second output conductor of the rectifier circuit; and (d) a fourth diode having a first electrode connected to the third output conductor of the rectifier circuit, and a second electrode connected to the second input conductor of the rectifier circuit.

12. The switching power supply of claim 1 wherein the rectifier circuit comprises:

(a) a first diode having a first electrode connected to a first input conductor of the rectifier circuit, and a second electrode connected to the first output conductor of the rectifier circuit;

(b) a second diode having a first electrode connected to the third output conductor of the rectifier circuit, and a second electrode connected to the first input conductor of the rectifier circuit;

(c) a third diode having a first electrode connected to a second input conductor of the rectifier circuit, and a second electrode connected to the first output conductor of the rectifier circuit;

(d) a fourth diode having a first electrode connected to the third output conductor of the rectifier circuit, and a second electrode connected to the second input conductor of the rectifier circuit;

(e) a fifth diode having a first electrode connected to the first input conductor of the rectifier circuit, and a second electrode connected to the second output conductor of the rectifier circuit; and (f) a sixth diode having a first electrode connected to the second input conductor of the rectifier circuit, and a second electrode connected to the second output conductor of the rectifier circuit.

* * * * *